US011847242B2

(12) United States Patent
Todd (10) Patent No.: US 11,847,242 B2
(45) Date of Patent: Dec. 19, 2023

(54) DCF NODE CONFIGURATION FOR DEVICE DATA

(71) Applicant: EMC IP Holding Company LLC, Hopkinton, MA (US)

(72) Inventor: Stephen J. Todd, Center Conway, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 479 days.

(21) Appl. No.: 16/886,203

(22) Filed: May 28, 2020

(65) Prior Publication Data

US 2021/0374264 A1 Dec. 2, 2021

(51) Int. Cl.
| | |
|---|---|
| G06F 3/00 | (2006.01) |
| G06F 21/62 | (2013.01) |
| G06F 21/78 | (2013.01) |
| G06F 8/61 | (2018.01) |
| G06F 9/54 | (2006.01) |
| G06F 16/16 | (2019.01) |
| G06F 9/445 | (2018.01) |

(52) U.S. Cl.
CPC ............ *G06F 21/6218* (2013.01); *G06F 8/63* (2013.01); *G06F 9/44505* (2013.01); *G06F 9/54* (2013.01); *G06F 16/164* (2019.01); *G06F 21/78* (2013.01)

(58) Field of Classification Search
CPC ........................................................ G06F 9/54
USPC ........................................................ 719/328
See application file for complete search history.

(56) References Cited

U.S. PATENT DOCUMENTS

| | | | | |
|---|---|---|---|---|
| 9,990,493 | B2* | 6/2018 | Bae | G06F 21/566 |
| 2002/0161983 | A1* | 10/2002 | Milos | G06F 3/0608 |
| | | | | 711/202 |
| 2010/0318609 | A1* | 12/2010 | Lahiri | G06F 9/5072 |
| | | | | 713/153 |
| 2011/0106597 | A1* | 5/2011 | Ferdman | G06Q 30/0241 |
| | | | | 235/375 |
| 2012/0240181 | A1* | 9/2012 | McCorkendale | G06F 21/53 |
| | | | | 726/1 |
| 2016/0173488 | A1* | 6/2016 | Xie | H04L 9/3263 |
| | | | | 713/156 |
| 2016/0381020 | A1* | 12/2016 | Moore, Jr. | G06F 21/44 |
| | | | | 726/1 |
| 2018/0268127 | A1* | 9/2018 | Poeluev | G06F 21/6281 |

(Continued)

FOREIGN PATENT DOCUMENTS

CN          106096446 A   *   11/2016       G06F 21/6218

OTHER PUBLICATIONS

Salah Alabady, Design and Implementation of a Network Security Model for Cooperative Network. (Year: 2009).*

(Continued)

*Primary Examiner* — Lechi Truong
(74) *Attorney, Agent, or Firm* — Workman Nydegger (57) ABSTRACT

One example method includes receiving, at a node of a data confidence fabric (DCF), a DCF backbone, installing the DCF backbone at the node, receiving a config file at the node, and the config file includes configuration information concerning the node, and receiving and installing a trust insertion component specified in the configuration information, where operation of the trust insertion component is enabled by the DCF backbone, and the trust insertion component is operable to associate trust metadata with data received by the node.

20 Claims, 8 Drawing Sheets

(56) References Cited

U.S. PATENT DOCUMENTS

2018/0285204 A1* 10/2018 Dwarampudi ........ G06F 11/302
2019/0230067 A1*  7/2019 Lal .......................... H04L 67/34
2020/0092308 A1*  3/2020 Vanguardia ......... H04W 12/121
2020/0117482 A1*  4/2020 Lopata ................ G06F 9/44521
2020/0134479 A1*  4/2020 Parthasarathy ....... G06F 16/252

OTHER PUBLICATIONS

Wei Liang, A Secure FaBric Blockchain-Based Data Transmission Technique for Industrial Internet-of-Things. (Year: 2019).*
Parth Thakkar, Performance Benchmarking and Optimizing Hyperledger Fabric Blockchain Platform. (Year: 2018).*

* cited by examiner

DCF NODE CONFIGURATION FOR DEVICE DATA

FIELD OF THE INVENTION

Embodiments of the present invention generally relate to data confidence fabrics. More particularly, at least some embodiments of the invention relate to systems, hardware, software, computer-readable media, and methods for flexibly and dynamically configuring a device data path through multiple data confidence fabric nodes.

BACKGROUND

A Data Confidence Fabric (DCF) inserts trust into device data streams. This capability enables disparate, and possibly competitive, workloads to share edge infrastructure and maintain isolation/privacy while consuming data in a metered fashion. Within a DCF, one or more sub-DCFs may be defined. However, there are a variety of technical challenges to overlaying differing levels of trust for different devices in the DCF.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics. More particularly, at least some embodiments of the invention relate to systems, hardware, software, computer-readable media, and methods for the configuration of device data paths in a data confidence fabric (DCF) that may include multiple nodes, and one or more sub-DCFs. In such environments, there may be a need to overlay different trust levels for different devices in the DCF.

In general, example embodiments of the invention may involve installation of a "DCF Backbone" some or all DCF nodes, where such nodes may take the form, for example, of edge devices such as IoT devices for example, although no particular device or device type is required. A DCF Device Config file, which may be specific to a particular device and/or type of device, may be created which describes which trust insertion technologies will be applied, at which level, for the data of that device.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the use of trust insertion technologies can be highly customized, such as by applying trust insertion technologies at an individual device level, and/or with respect to particular data of an individual device. One embodiment of the invention provides insertion of trust insertion technologies in DCF environments that may include one or more sub-DCFs, which may or may not be device-specific. An embodiment of the invention provides trust insertion technologies in DCFs where there is a need to overlay different respective levels of trust for the same device, and/or, for different devices.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be employed in any environment where data is collected by one or more devices, such as Internet of Things (IoT) devices for example, and passes through a network, such as a DCF, on the way to an end user, such as an application for example. The data may be generated and collected by one or more devices at the direction of the application and/or of another entity. Any portion(s) of the DCF may be elements of a cloud computing environment. The DCF may have any number of nodes, which may individually and/or collectively define one or more data paths through part or all of the DCF. The nodes of the DCF may define various levels through which data from the devices may pass. Any given data from one or more devices may travel one or more paths through the DCF. One or more of the levels of the DCF may comprise one or more nodes, which may be implemented as any type of system and/or device. Any node may comprise hardware, software, or a combination of hardware and software. Any of the nodes may be capable of associating, such as by insertion, trust information with device data that enters, or passes through, that node. Thus, trust information may be inserted at any level, or levels, of the DCF. One example level of a DCF may comprise one or more gateways, and another example level of a DCF may comprise one or more edge devices. Still another example level of a DCF may comprise a cloud computing and/or cloud data storage environment. The devices in the DCF may be any device that is operable to collect and/or transmit data. In some embodiments, the devices both collect and transmit data, while a level or levels above the devices may not collect data, but may only receive, and pass along, data from a device. In some embodiments, one or more devices may take the form of a sensor or sensor array, although that is not required. In some embodiments, a sensor may take the form of a transducer. Such sensors may, for example, collect data concerning one or more physical and/or other aspects of an environment with which the sensor is in communication. By way of example, sensors may sense, and collect/transmit data concerning, a wide variety of features such as temperature, color, gas concentrations, fluid concentrations, pressure, weight, light, heat, fluid/gas flow, humidity, magnetic and electrical fields, computing environment parameters such as data transmission speeds, latency, and bandwidth. The variety of these examples illustrates the wide range of parameters that may be sensed, and reported on, by some example sensors.

New and/or modified data collected and/or generated in connection with some embodiments may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example public cloud computing and/or storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Context for Some Example Embodiments

Figure 1:
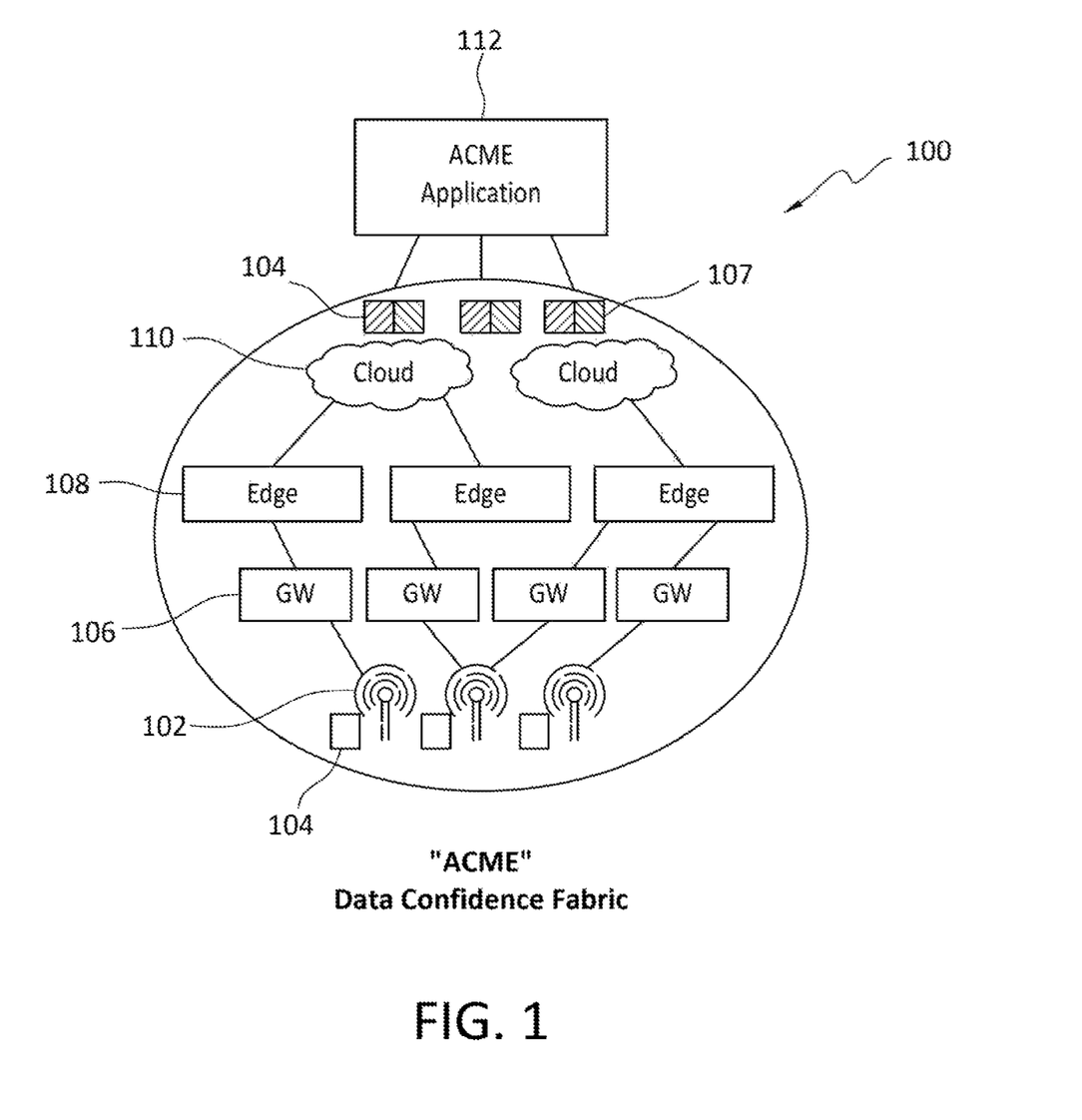
FIG. 1 discloses aspects of an example data confidence fabric (DCF).

With reference now to FIG. 1, some contextual and other information is provided concerning some example embodiments. In particular, FIG. 1 discloses a DCF 100 for a fictional company 'ACME.' The example DCF 100 includes one or more devices 102 that are operable to collect and transmit data 104. The data from the devices 102 may be transmitted to a first level of the DCF that comprises one or more gateways 106. As shown, data 104 may be transmitted to multiple gateways 106. One or more of the gateways 106 may add trust metadata 107 to the received data 104, and then pass the data 104 and trust metadata 107 to one or more edge devices 108 that collectively define a second level of the DCF 100. One or more of the edge devices 108 may, in turn, insert additional trust metadata to create updated trust metadata 107 and then pass the data 104 and trust metadata 107 to a cloud environment such as a cloud computing site 110, from where an application 112 performing an application workload may access the data 104 and the trust metadata 107.

Thus, in FIG. 1, the raw device data 104 may flow through multiple levels of a generic hardware environment that has various levels of processing, memory, and storage capabilities. As the data 104 flows through the levels, DCF software running on each node may add provenance and trust metadata/scoring, collectively, the trust metadata 107, to the data 104. The application 112 may access the trust metadata 107 and use the trust metadata as a basis to measure and/or otherwise evaluate the trustworthiness of the data 104.

Figure 2:
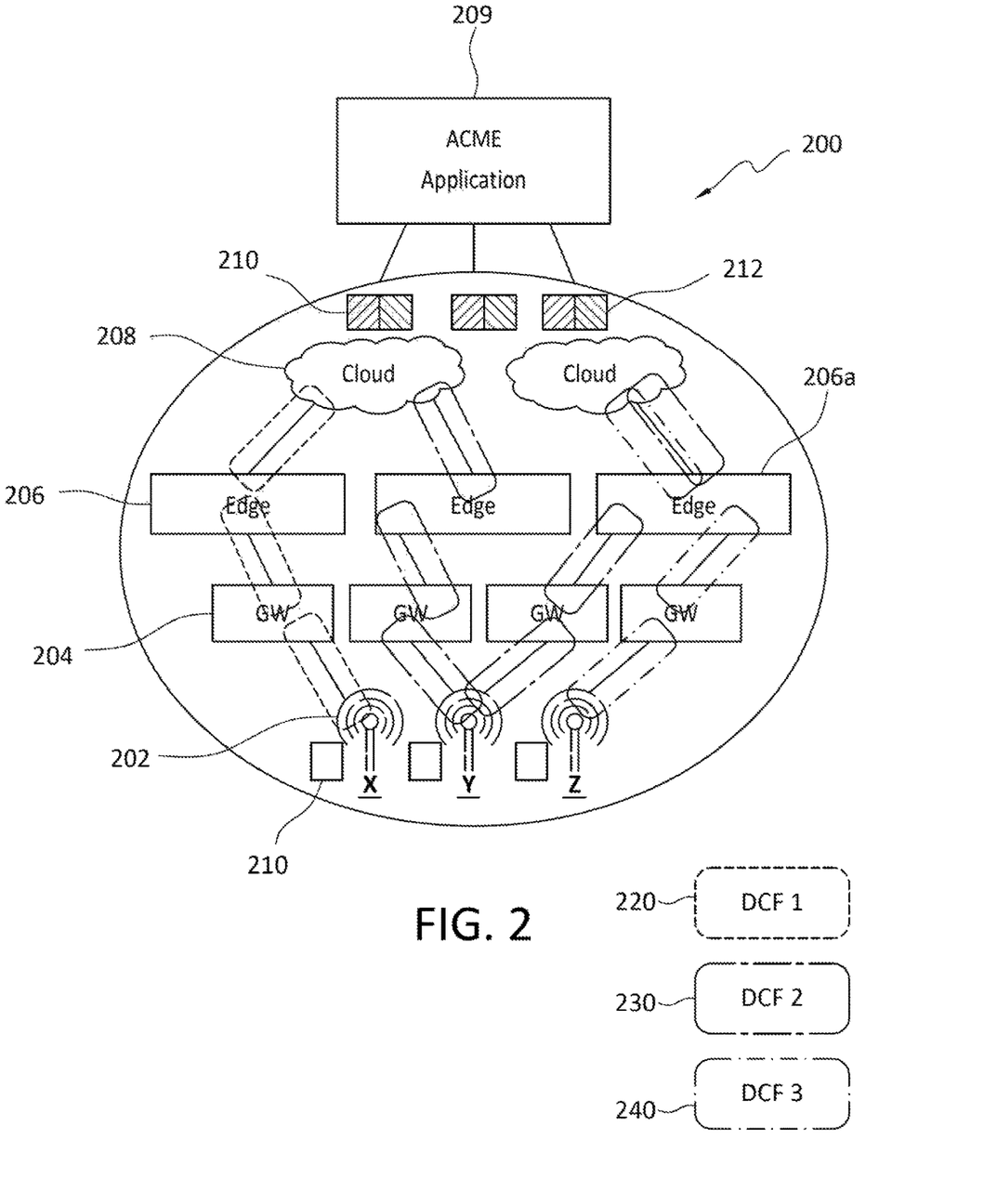
FIG. 2 discloses aspects of another example DCF with multiple sub-DCFs.

With reference now to FIG. 2, details are provided concerning some challenges that may arise when attempting to configure, and maintain/enhance, a DCF such as the example DCF 100 disclosed in FIG. 1. In general, FIG. 2 is concerned with an example DCF 200 in which there is a need to overlay different levels of trust for different devices 202. Except as noted otherwise, the DCF 200 may be similar to, or the same as, the DCF 100. In the example of FIG. 2, a total of nine nodes are indicated, namely, four gateways 204, three edge devices 206, and two clouds 208, that are may be partitioned as members of the DCF 200, which may be a DCF of a fictional business entity 'ACME' that is running an application 209. In this example, the DCF 200 includes three devices 202, namely, 'X,' 'Y,' and 'Z.' Respective data 210 from each of the devices 202 may flow over different paths and, as the data 210 flows, one or more of the nodes may insert trust metadata 212, which may indicate different levels of trust, into the data 210.

As indicated in FIG. 2, one or more of the devices 202 may be associated with a respective DCF that comprises, or consists of, the nodes through which data from that device 202 travels. In particular, the DCF-1 220 comprises, in this example, device 'X' 202, one gateway 204, one edge device 206, and one cloud 208, for a total of one device and 3 nodes. Thus, data 210 in the DCF-1 220 may have a certain level of trust, as collectively indicated by respective trust metadata inserted by one or more of the nodes of that DCF-1 220. As shown in FIG. 2, the DCF-1 220 does not overlap with the DCF-2 230 or with the DCF-3 240. However, and as discussed in more detail below, the DCF-2 230 and the DCF-3 240 overlap with each other. Note that the DCF-1 220, DCF-2 230, and DCF-3 240 may be referred to as sub-DCFs insofar as they include fewer than all the nodes of the overall DCF 200.

With continued reference to FIG. 2, the DCF-2 230, which may operate in the same manner as the DCF-1 220 at least in terms of the insertion of trust metadata, handles data 210 from device 'Y' 202. In this illustrative example, the DCF-2 230 comprises device 'Y' 202, two gateways 204, two edge devices 206, and two clouds 208, for a total of one device and six nodes.

Finally, the example DCF-3 240, which may operate in the same manner as the DCF-1 220 at least in terms of the insertion of trust metadata, handles data 210 from device 'Z' 202. In this illustrative example, the DCF-3 240 comprises device 'Z' 202, one gateway 204, one edge device 206, and one clouds 208, for a total of one device and three nodes. Note that DCF-2 230 and DCF-3 240 have one node in common, namely, the edge device 206a.

While the example DCF 200 may provide a variety of useful functionalities, its configuration and maintenance may be challenging. One challenge concerns the decentralized commit of new configurations. Particularly, as new or modified sub-DCFs are created and deployed on a per-device level, it can be problematic to communicate these new/modified DCF configurations to existing DCF nodes. For example, a centralized approach in which all nodes communicate with a central authority to obtain configuration information would not scale well, if at all. This may be appreciated by considering an example of a DCF that may include tens of thousands of nodes geographically distributed. It would not be practical or possible to have a central authority continuously monitoring and reporting DCF configuration changes.

A related challenge concerns the authentication/authorization of new DCF configurations. Particularly, if a given DCF node is asked to re-configure the way that the node inserts trust into device data, it would be difficult to keep track of exactly which administrators are allowed to change the node configurations. This difficulty may also be due to the fact that centralized directory solutions, such as the Lightweight Directory Access Protocol (LDAP) and Active Directory (AD) for example, suffer from the same scaling issues and performance delays noted above.

A further challenge with configuration/maintenance of a DCF such as the DCF 200 concerns the size and scope of the trust insertion footprint. For example, there may be hundreds of different trust insertion components, such as signatures, encryption, provenance, that could insert some sort of trust into device data, such as the data 210, as the data flows through any given node. As the device data flows 'northward' towards an application such as the application 209 in FIG. 2, the data may initially encounter one or more processing nodes with restricted compute/memory/storage footprints. These footprint challenges may make it difficult to store trust insertion technologies locally at the nodes. A related challenge is that it may be possible that an administrator wishes to run a trust insertion component in an environment that is so constrained in terms of its functions and abilities that it does not have enough processing power or memory to run the component.

A final example challenge concerns trust insertion versions. Particularly, any given trust insertion component, for example, any component that digitally signs data, may be upgraded to a new version. However, there is no way for any given DCF node to know that this change needs to occur.

C. Example Data Confidence Fabric (DCF) Backbones

Figure 3:
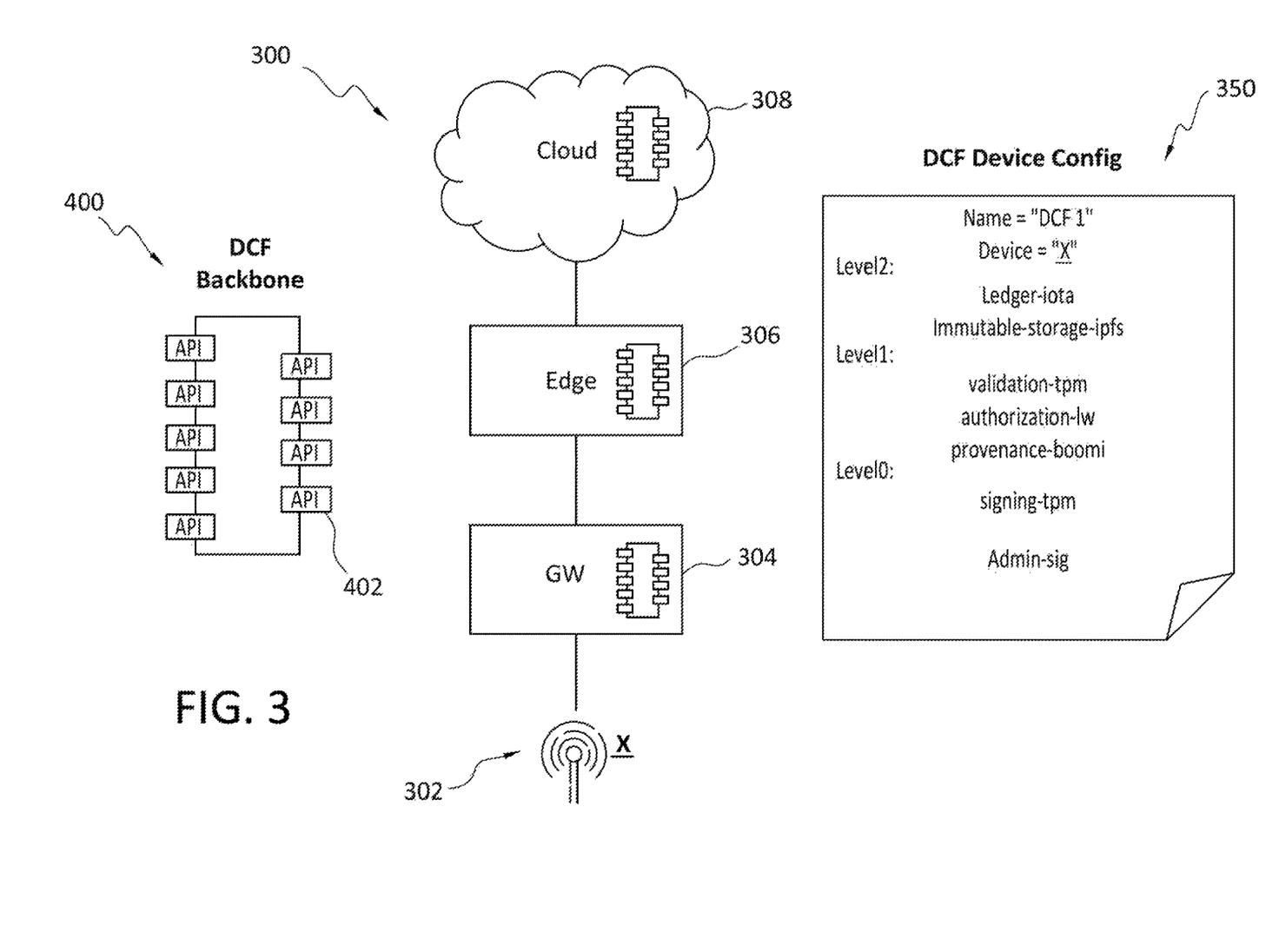
FIG. 3 discloses an example DCF backbone and config file.

With particular attention now to FIG. 3, a simplified portion of a DCF 300, and an associated DCF Device Config file 350, are disclosed. In general, a DCF may connect one or more devices with one or more applications. In the particular example of FIG. 3, the DCF 300 comprises a device 'X' 302, a gateway 304, an edge device 306, and a cloud 308. In general, these elements of the DCF 300 may be configured, and operate, similarly to the other example DCF elements disclosed herein, including those of the DCF 100 and DCF 200. As further indicated in FIG. 3, any of the nodes of the DCF 300 may include a corresponding DCF backbone, one example of which is generally denoted at 400.

The DCF backbone 400 may take any of a variety of different forms. In at least some embodiments, the DCF backbone 400 may be a low-footprint, portable software entity that inserts trust information, such as trust metadata, into device data as that passes through the node that includes the DCF backbone 400. The components that are used to perform trust insertion, such as any of the gateway 304, edge device 306, and cloud 308, may or may not be present in the DCF 300 at the time of DCF backbone 400 installation. For example, those components may be pre-configured, or loaded at a later point in time.

In general, the DCF backbone 400 may contain a dynamic trust insertion Application Program Interface (API) 402 that enables trust insertion components to be identified and loaded into the DCF backbone 400 software. In particular, the DCF backbone 400 may include a respective API 402 for each of a plurality of different components that may insert trust insertion information at one or more levels of the DCF 300. Examples of such components are disclosed in FIG. 4, discussed below. It is noted that late loading of trust insertion components may enable the DCF backbone 400 to run even in a constrained environment, such a sensor or small gateway, that may have limited memory and/or processing power.

With continued reference to FIG. 3, a 'blank' DCF backbone such as the DCF backbone 400 for example, is loaded onto multiple levels of the DCF 300, namely, the gateway 304, edge device 306, and cloud 308, in the example of FIG. 3. Note that it is not necessary that a DCF backbone 400 be installed on all, or even any, of the nodes in a DCF. In general, a DCF backbone may be installed in any node(s) of a DCF where trust insertion is to be performed.

As noted earlier, a DCF Master Config file, or simply 'config file,' 350 may be provided that describes, for any given device, the trust insertion components that are applied at any given level of the DCF 300 through which data from that device passes. Thus, each device of a node of the DCF 400 may have its own respective config file 350, although the same config file 350 may be used for multiple devices. The config file 350 may be created, for example, by an administrator at a central location and then pushed out to the node(s) where trust insertion will be performed. In other embodiments, a node may access a config file 350, which may reside at a remote location, and then download the config file 350.

In the particular example of FIG. 3, the config file 350 for device 'X' 302 shown in FIG. 3 specifies, for example, the particular trust insertion technique(s) or process(es) to be performed, and the level of the DCF 300 at which the associated trust metadata should be inserted. Thus, in FIG. 3, the config file 350 specifies that the lowest level node (Level0), the gateway 304, will perform Trusted Platform Module (TPM—ISO/IEC 11889) signing of the data from the device 302. As well, the example config file 350 specifies that the next highest node (Level1), the edge device 306, will perform three trust insertion techniques, specifically: (i) attaching provenance information, such as a chronology of ownership, custody, and/or location, of the device 302 data; (ii) performing authorization on any clients requesting to access device X 302 data; and (iii) validation of the TPM signature. Finally, the example config file 350 specifies that the highest node (Level2), the cloud 308, will store the device data in an object storage system and register the device data into a blockchain.

In the example config file 350 of FIG. 3, the names of the trust insertion technologies, such as ledger-iota, validation-tpm, and provenance-boomi, list both the type of trust insertion, and then the specific technology or vendor that implements the trust insertion. Thus, in the illustrated example, 'ledger-iota' refers to an open source ledger technology, employed in blockchain environments, that is known by the name 'IOTA.' This is a trust insertion technology that, as noted above, may direct the cloud 308 to register the device 302 data in a blockchain. As well, 'validation-TPM' refers to performance of a validation process in accordance with the TPM standard. As another example, 'provenance-boomi' refers to the boomi platform which may be used to move and manage metadata, particularly provenance metadata, concerning the device 302 data. With reference to another example of a trust insertion technology that may appear in a config file, FIG. 3 discloses 'immutable-storage-ipfs' which refers to the InterPlanetary File System (IPFS) for storing and sharing data in a distributed file system. That is, the config file 350 may instruct the Level2 node, cloud 308, to store the device 302 data in a manner consistent with the IPFS protocol. Finally, the example config file 350 specifies 'admin-sig' which indicates that an administrator must digitally sign the device 302 data at the Level0 node, that is, the gateway 304.

It will be appreciated that any type and combination of trust insertion technologies, for any level(s) of a DCF, may be specified in a config file. Moreover, a config file may employ any format that is adequate to enable the specification of one or more trust insertion technologies, and the scope of the invention is not limited to the disclosed examples of a config file. Thus, for example, in some other embodiments, other technologies may be employed in a config file, such as the attachment of version numbers, or the use of content addresses or URLs to refer to a specific trust insertion technology.

Thus, use of a config file approach enables, among other things, the definition of groups of trust insertion processes to assigned to, and implemented at, any one or more nodes of a DCF. Note that a config file may address as few as one nodes, and as many as all the nodes, in a DCF. Thus, trust insertion may be performed at one or more nodes of a DCF, at any level(s), as dictated by one or more config files. Further, the config file need not specify any particular trust insertion process for any particular level, node, or device. Thus, the config file 350 disclosed in FIG. 3 is presented only by way of illustration, and is not intended to limit the scope of the invention in any way.

D. Example Trust Insertion Catalogues

Figure 4:
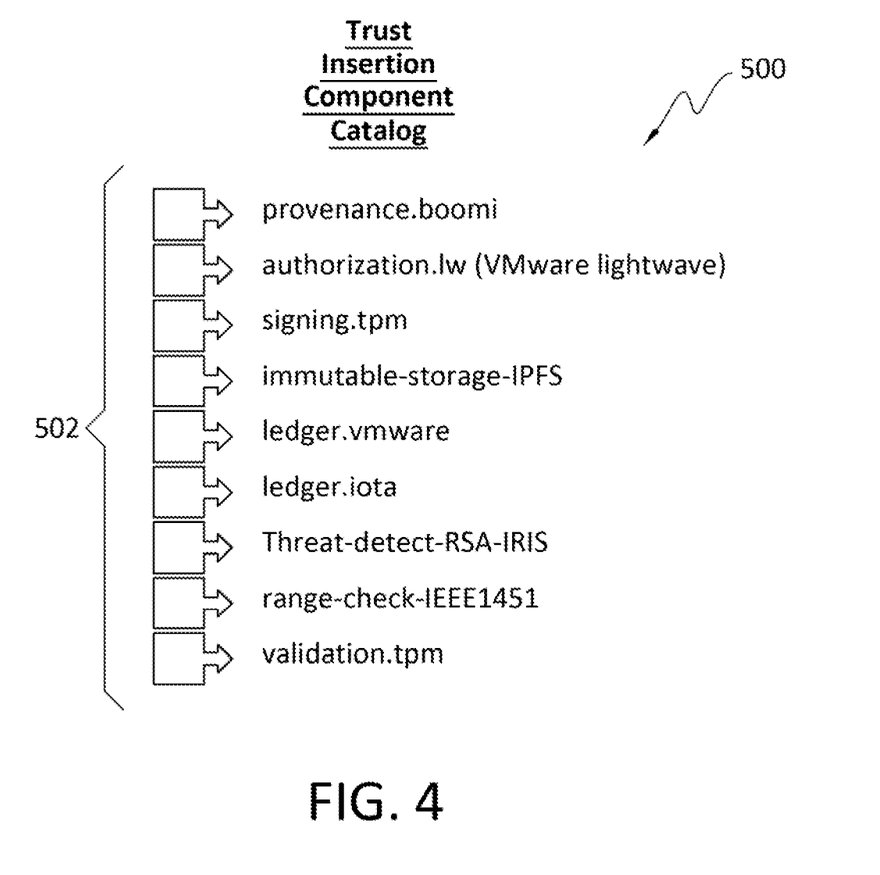
FIG. 4 discloses an example trust insertion component catalog.

Directing attention now to FIG. 4, details are provided concerning trust insertion catalogues, one example of which is denoted generally at 500. In general, a trust insertion catalog 500 may list/include various components 502 that may be loaded into a DCF backbone and so, reside at the node where the DCF backbone is located. Each of the components 502 may be compatible with one or more APIs of the DCF backbone. In FIG. 4, various example components 502 are indicated. Each of the components 502, when inserted into a DCF backbone, may be invoked automatically as data passes through the DCF backbone. In some embodiments, the invocation of a component may be triggered, for example, by the completion of operations by another component. For example, the 'signing.tpm' component 502 may be called, given a pointer to device data, and a TPM signature may then be appended to the device data by the 'signing.tpm' component 502. As another example, the 'provenance.boomi' may be given a pointer to device data, and the Dell Boomi software can attach provenance data about the device hardware and software environment. Further, the 'threat-detect-RSA-IRIS' may be given a pointer to the device data, and the Project IRIS software by RSA may evaluate the device data to see if that data contains any threats. Any threats may be neutralized, or the data may be deleted, or isolated and scrubbed before being passed on to another node. As a final example, the 'range-check-IEEE1451' may be given a pointer to the device data, and the IEEE 1451 standard (for adding plug-and-play capabilities to an analog transducer) may evaluate the data to determine whether or not the device that generated the data is operating properly.

Note that the catalog 500 and/or the config file (see FIG. 3) may, or may not, specify at the node level, a particular order in which trust insertion processes are to be performed. As well, different 'versions' or 'revisions' of trust insertion components may be contained in the catalog 500. A DCF config file may specify a specific version of a component 502, such as 'version 1.X,' or the config file may specify that the latest revision of the component 502 is always used. Both the config file and the catalog may be updated periodically, and/or automatically, as revisions to the components and/or new components become available.

With continued reference to FIG. 4, it is noted that the catalog 500 may be sourced in a variety of ways. For example, the entire catalog 500 may be pushed indiscriminately to all of the nodes in the DCF. In this case, the catalog 500 may include all of the components that may be needed by any of the nodes in the DCF. In another embodiment, the catalog 500 may be accessible to the nodes by way of a portal of a web service. In this example, each node can use the portal to access the web service and download a node-specific catalog that includes only the components needed by that node. In still another approach, node-specific, or general, catalogs can be pushed down to the nodes along with the respective config files for each of the nodes. This approach may be particularly useful in situations where nodes are relatively lightweight in terms of their processing power and/or memory/storage capabilities.

E. Example Approaches to Trust Insertion Loading

Various approaches may be employed for trust insertion loading. These include static trust insertion loading, and dynamic trust insertion loading. In general, when a DCF node boots or is reset, the DCF node may fetch a pointer to the DCF master config file for each device that the DCF node is managing. The DCF node may also fetches the 'level,' such as Level0, Level1, and Level2 for example, that describes where that DCF node will run in the DCF network. Some example DCF levels and DCF configurations are discussed above in connection with FIGS. 1 and 2, for example. Once the DCF node has fetched the DCF master configuration, the DCF node may then configure itself in various ways, such as statically, or dynamically. With attention now to FIG. 5, details are provided concerning these two example approaches.

Figure 5:
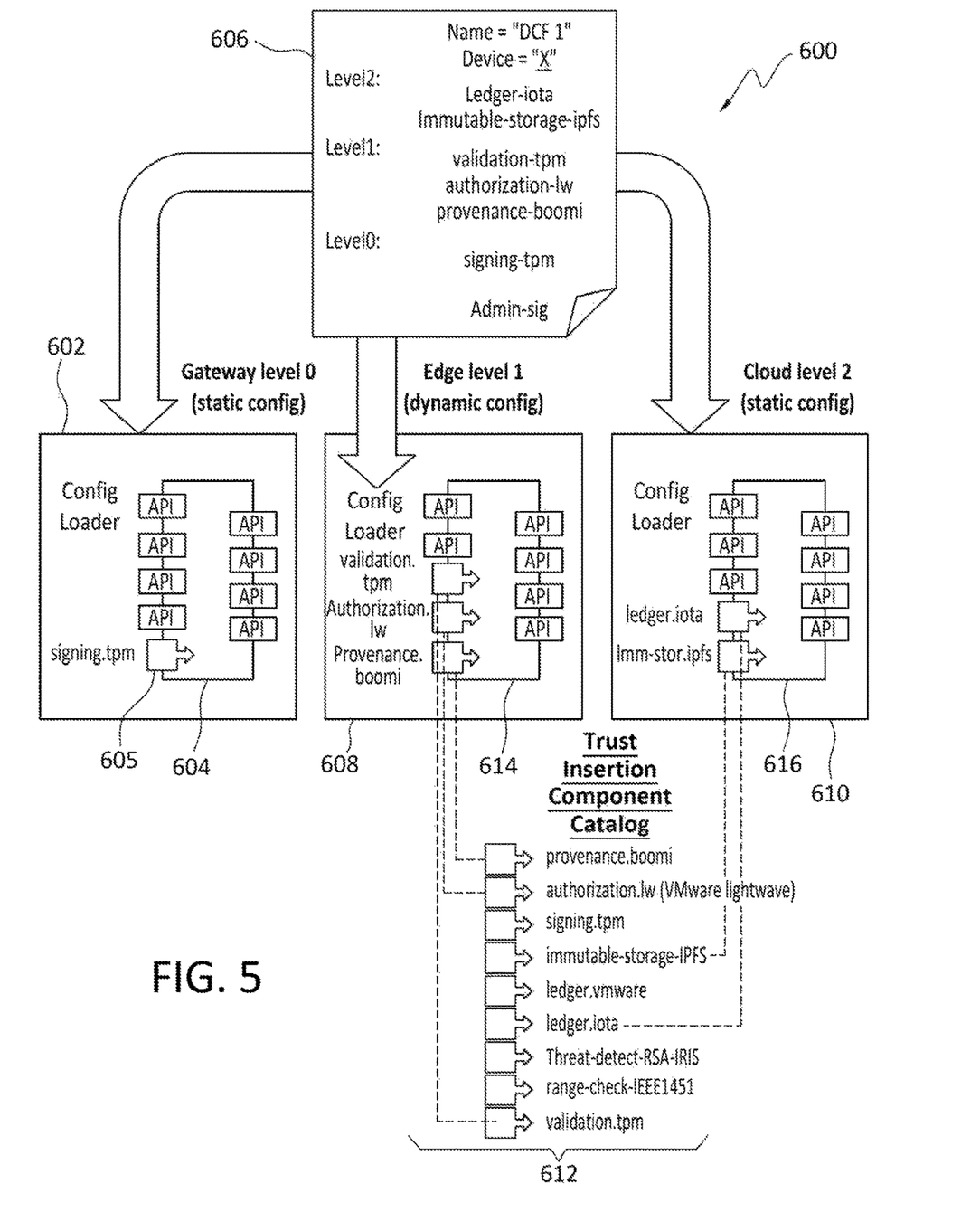
FIG. 5 discloses aspects of static and dynamic trust insertion component loading.

In general, FIG. 5 discloses an arrangement 600 in which one or more trust insertion components may be inserted statically, and/or dynamically. In the illustrative example of FIG. 5, the gateway 602 (Level0) node, has a pre-configured DCF backbone 604 which has already loaded the 'signing.tpm' component 605, as shown in FIG. 5. In particular, when the gateway 602 loads its DCF config file 606, or the config file 606 is pushed to the gateway 602, the gateway 602 may scan the config file 606 and determine that, as specified in the config file 606 for Level0, the only task of the gateway 602 is to sign data using a TPM. The gateway 602 may scan the backbone 604 and determine that the specific trust insertion component, that is, the 'signing.tpm' component 605, is already installed in the backbone 604.

In contrast with the gateway 602 (Level0) node, an edge device 608 (Level1) node and/or cloud 610 (Level1) node may not have pre-loaded trust components, or may have one or more pre-loaded trust components but also need one or more other trust components that have not been pre-loaded. In this circumstance, the edge device 608 and the cloud 610 may contact a trust insertion component catalog 612 (see also, e.g., FIG. 4) to dynamically fetch and load the appropriate component(s) for their respective level. In some embodiments, the need to fetch one or more trust insertion components from the trust insertion component catalog 612 may be determined through scanning, by the edge device 608 and the cloud 610, of the config file 606 to determine what trust insertion components are required, and scanning, by the edge device 608 and the cloud 610, of the respective backbones 614 and 616 to determine which trust insertion components are/are not installed.

To illustrate, and with continued reference to FIG. 5, the edge device 608 may scan the config file 606 and determine that, at the Level1 of the edge device 608, various trust insertion components are needed, namely, 'validation-tpm,' 'authorization-lw,' and 'provenance-boomi.' Since none of these trust insertion components have been installed at the node of the edge device 608, the edge device 608 may retrieve these trust insertion components from the trust insertion component catalog 612, and then the edge device 608 may install those retrieved trust insertion components. A similar process may be performed by the cloud 610 for the Level2 trust insertion components, namely, 'ledger-iota' and 'immutable-storage-ipfs.'

Note that no particular use of static and/or dynamic loading of trust insertion components is required. Thus, all, some, or no, components of a node may be statically loaded. As well, all, some, or no, components of a node may be dynamically loaded. Further, any node may have one or more components statically loaded and/or one or more components dynamically loaded. Thus, the processes and configuration of FIG. 5 are provided only by way of illustration, and are not intended to limit the scope of the invention in any way.

Figure 6:
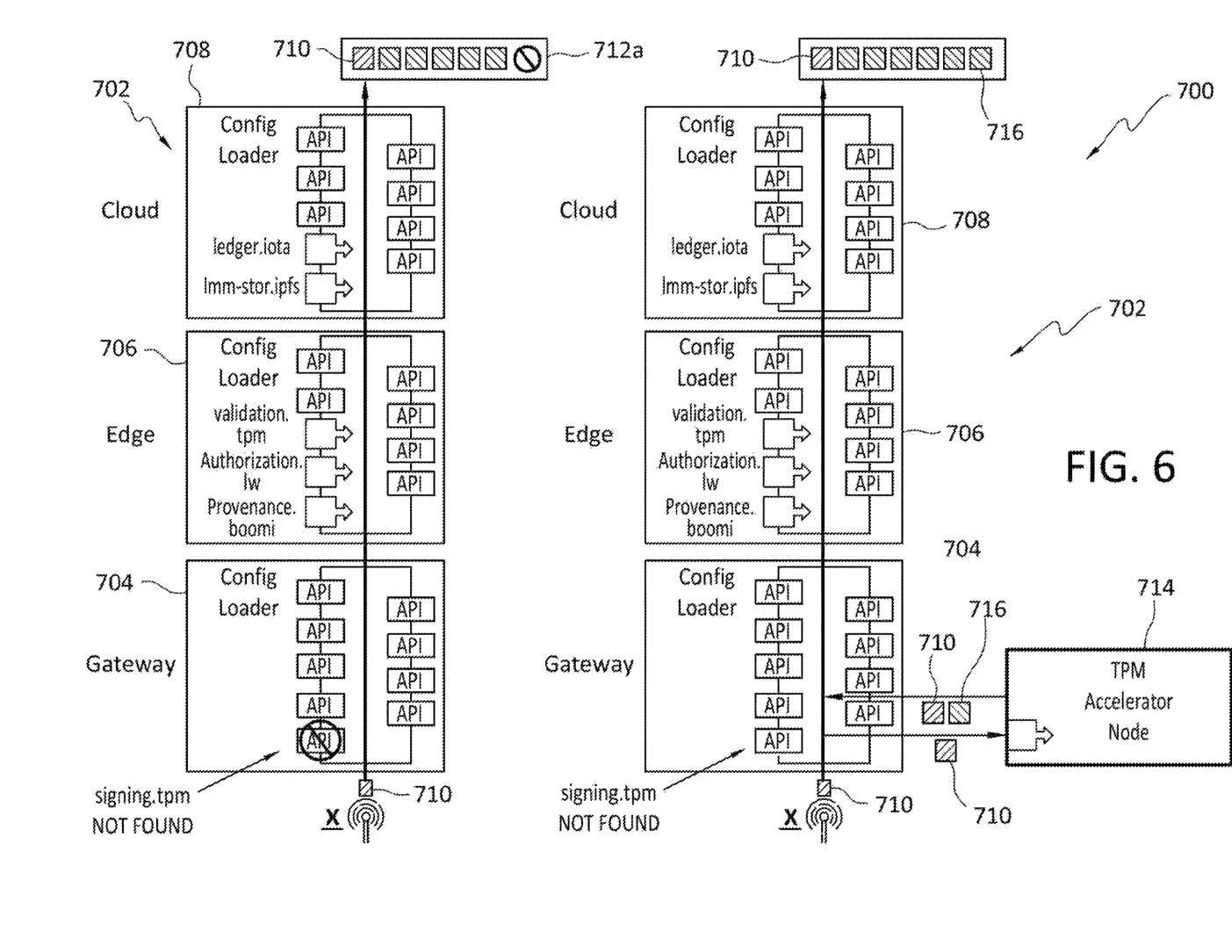
FIG. 6 discloses use of an accelerator node for device data processing.

Circumstances may sometimes arise in which a trust insertion component is required at a node, but that trust insertion component has not been pre-loaded, and cannot be found in a trust insertion component catalog or other locations. With reference now to FIG. 6, a configuration 700 is shown that disclose some possible approaches to handling such circumstances. In general, these approaches may involve DCF call-outs to 'nearby' accelerators, and/or trust components. In the illustrative example of FIG. 6, a DCF 702 has nodes at three levels, that is, gateway 704 (Level0), edge device 706 (Level1), and cloud 708 (Level2), that have booted. However, the gateway 704 does not have the 'signing-tpm' trust insertion component that is required at that node, as specified in a config file, such as the example config file 606.

Consequently, and as shown at the left side of FIG. 6, the gateway 704 is not able to execute a TPM signature operation on the data 710 that it is processing and passing up the DCF chain. Thus, the gateway 704 may mark the failure to execute the TPM signature operation, and pass the data 710 up the levels in the chain. Because the data has not been signed, the overall confidence score 712a assigned to the data 710 may be relatively lower, as reflected by the rightmost element of 712a, than if the data 710 had been signed.

However, as shown on the right hand side of FIG. 6, the gateway 704 may call a local accelerator node 714, which may be in the form of hardware and/or software, that has TPM signature capability, and is able to sign the data, thus adding trust insertion metadata 716 to the data 710. In more detail, the gateway 704 may take the result from the accelerator node 714, record that it was the accelerator node 714, rather than the gateway 706, that signed the data 710, and then pass the data 710 and trust insertion metadata 716 up the chain.

Note that there may be various ways for the gateway 704, and/or other node(s), to ascertain the presence of an accelerator node, such as the accelerator node 714. For example, in some instances, one or more accelerator nodes may broadcast their presence and services in such a way that a node of the DCF can locate, and communicate with, the accelerator node. Additionally, or alternatively, a node of a DCF can send out a ping or other signal to locate any accessible accelerator nodes with the needed capabilities. If the DCF node receives a response to the ping, the DCF node may determine, from that response if the responding accelerator has the necessary capabilities. In some cases, the DCF node will only receive a response, if any, from an accelerator node with the necessary capabilities. Any of the disclosed trust insertion services and capabilities may be provided by an accelerator node.

F. Example Methods

Figure 7:
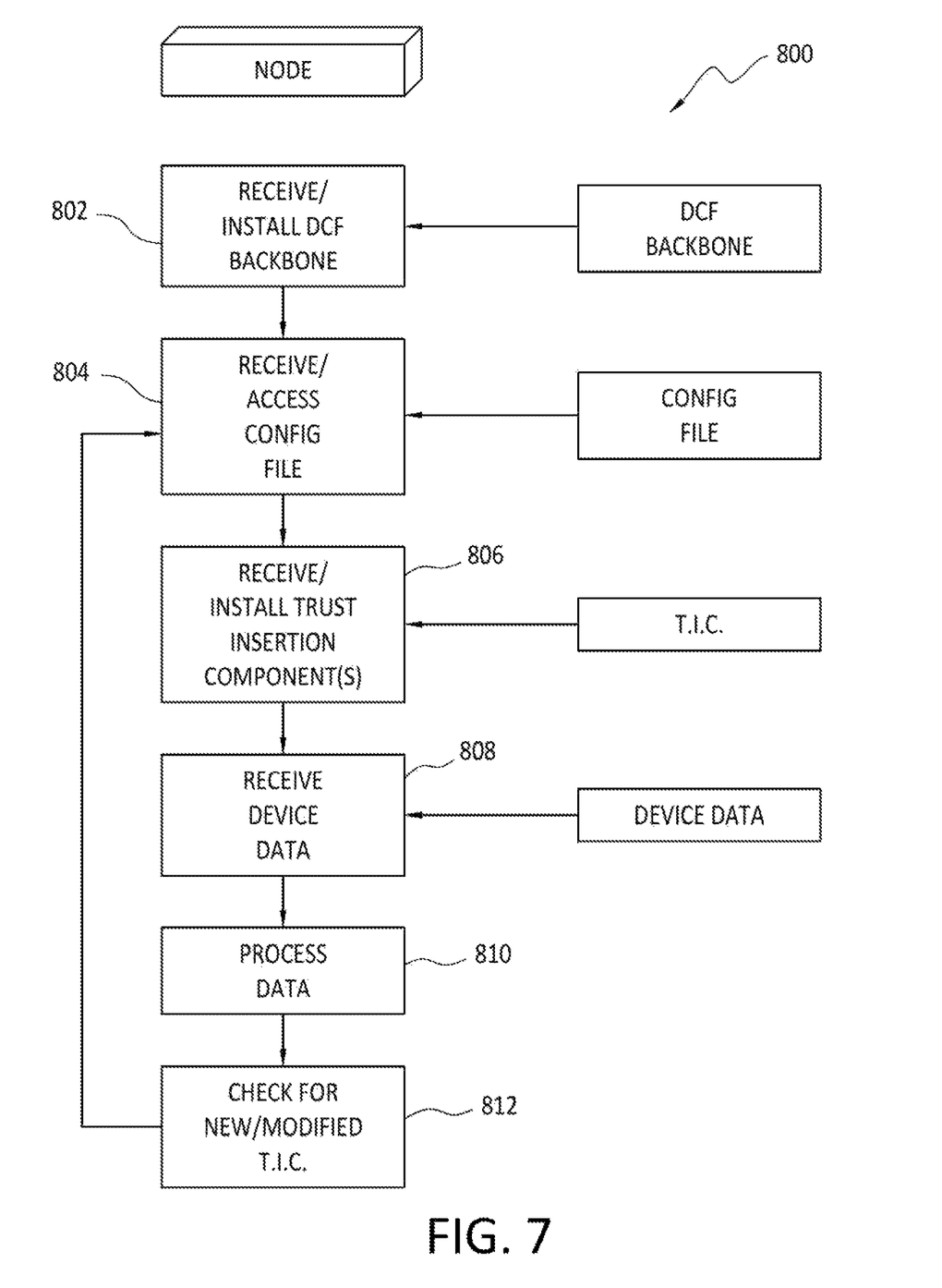
FIG. 7 discloses an example method for configuring a DCF node.

Attention is directed now to FIG. 7, where one example method for DCF node configuration is disclosed. It is noted with respect to the example method of FIG. 7, as well as to any of the other disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

In some embodiments, the method of FIG. 7 may be performed in whole, or in part, by one or more nodes of a DCF. In some embodiments, a node may perform the method in cooperation with other entities that create a backbone and a config file. The node may comprise, or consist of, one or more entities, examples of which are disclosed herein and include a gateway, edge device, or cloud. Any of the entities may comprise hardware and/or software.

With particular reference now to FIG. 7, one example method is denoted generally at 800. The method 800 may begin when a node of a DCF installs 802 a DCF backbone. The DCF backbone may be received from another entity and, in some embodiments, the DCF backbone may be installed on the node by another entity. The installed DCF backbone may, or may not, be blank at the time of installation.

Before, during, or after, installation 802 of the DCF backbone, the node may access 804, or otherwise obtain information from, a config file that is specific to the entity associated with the node. In some embodiments, the config file may be downloaded by the node from a web service or other central source, and then installed at the node. In other embodiments, the config file may be pushed by a source to the node. If the DCF backbone is blank when the config file information is obtained 804, the node, or other entity, may then access a trust insertion component catalog and install 806 the trust insertion components specified in the config file for the node.

After the trust insertion components are installed 806 and/or if trust insertion components are already present at the node, the node may begin to receive data 808. The data may originate at a device such as an IoT device, and the node may receive the data directly from that device, or indirectly from the device by way of one or more other nodes. The received data may then be processed 810 using the installed trust insertion components specified by the config file for the device.

In some embodiments, the node may periodically check 812 for any new/modified trust insertion components. In this way, the node may be kept up to date in terms of the functions it is needed to perform.

E. Further Example Embodiments

Following are some further example embodiments of the invention. These are presented only by way of example and are not intended to limit the scope of the invention in any way.

Embodiment 1. A method, comprising: receiving, at a node of a data confidence fabric (DCF), a DCF backbone; installing the DCF backbone at the node; receiving a config file at the node, and the config file includes configuration information concerning the node; and receiving and installing a trust insertion component specified in the configuration information, where operation of the trust insertion component is enabled by the DCF backbone, and the trust insertion component is operable to associate trust metadata with data received by the node.

Embodiment 2. The method as recited in embodiment 1, wherein the DCF backbone is blank at the time of installation at the node.

Embodiment 3. The method as recited in any of embodiments 1-2, wherein the DCF backbone includes an API which enables the node to invoke the trust insertion component.

Embodiment 4. The method as recited in any of embodiments 1-3, wherein the node comprises hardware and/or software.

Embodiment 5. The method as recited in any of embodiments 1-4, wherein the node is one of a gateway, edge device, or cloud.

Embodiment 6. The method as recited in any of embodiments 1-5, wherein the configuration file information identifies a function to be performed by the node with respect to data received by the node, and a trust insertion component that is configured to perform the function.

Embodiment 7. The method as recited in any of embodiments 1-6, further comprising receiving data either directly or indirectly from a device that generated the data, and processing the data using the trust insertion component, and the processing of the data comprises associating trust metadata with the data received from the device.

Embodiment 8. The method as recited in embodiment 7, wherein the device that provides the data to the node is a sensor.

Embodiment 9. The method as recited in embodiment 7, wherein the data is received at the node by way of another node.

Embodiment 10. The method as recited in any of embodiments 1-9, wherein the trust insertion component is installed onto the DCF backbone.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
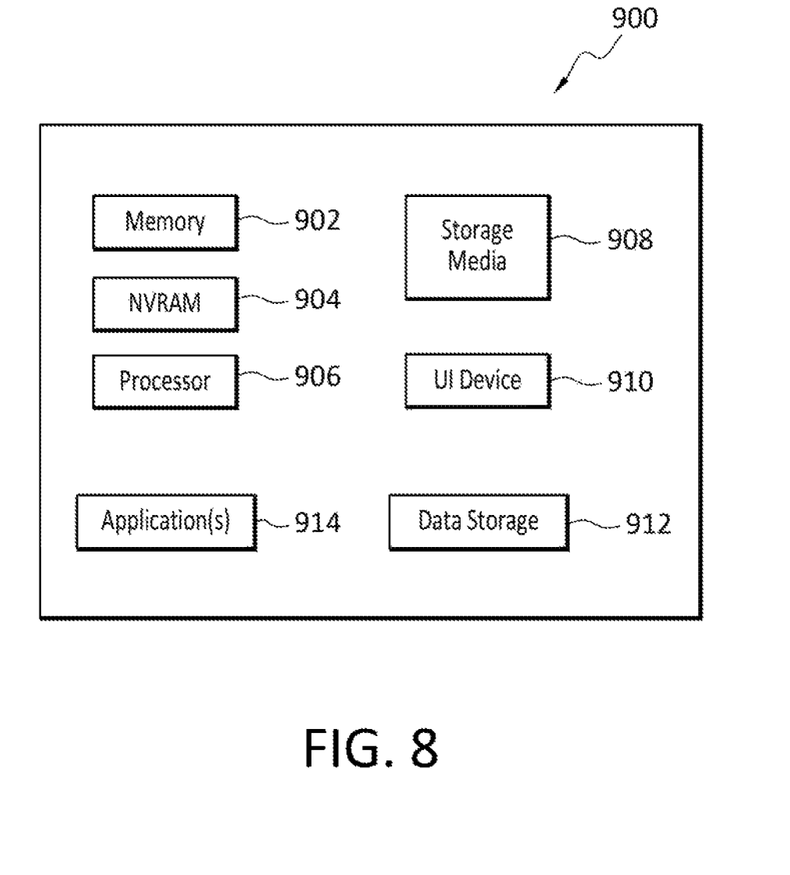
FIG. 8 discloses an example computing entity.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 8.

In the example of FIG. 8, the physical computing device 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, at a node of a data confidence fabric (DCF), a DCF backbone;
installing the DCF backbone at the node, wherein the DCF backbone comprises multiple application program interfaces (APIs), and each of the APIs enables a different respective trust insertion component to be identified, and loaded into the DCF backbone;
receiving a config file at the node, wherein the config file describes which trust insertion technologies will be used, by which of the trust insertion components, to associate trust metadata with data received by the node, the trust insertion components update the trust metadata by adding additional trust metadata at the node, and the updated trust metadata is available to a consumer to enable the consumer to evaluate a trustworthiness of the data before consuming the data; and
receiving, from a trust insertion component catalog, and installing, into the DCF backbone, the trust insertion components described in the config file, where operation of the trust insertion components to evaluate the data and insert trust metadata concerning that data is enabled by the DCF backbone.

2. The method as recited in claim 1, wherein the DCF backbone is blank at the time of installation at the node.

3. The method as recited in claim 1, wherein the APIs enable the node to invoke the one or more trust insertion components.

4. The method as recited in claim 1, wherein the node comprises hardware and/or software.

5. The method as recited in claim 1, wherein the node is one of a gateway, edge device, or cloud.

6. The method as recited in claim 1, wherein the config file identifies a function to be performed by the node with respect to the data received by the node.

7. The method as recited in claim 1, wherein a device that provides the data to the node is a sensor.

8. The method as recited in claim 1, wherein the trust insertion components, after installation in the DCF backbone, are invoked automatically as the data passes through the node.

9. The method as recited in claim 1, wherein the DCF backbone is blank prior to loading of the trust insertion components, and the DCF backbone cannot support performance of trust insertion operations until after the trust insertion components are loaded.

10. The method as recited in claim 1, wherein the DCF backbone is configured to be scanned by the node to enable the node to determine which of the trust insertion components are, or are not, installed at the node.

11. A non-transitory storage medium having stored therein instructions that are executable by one or more hardware processors to perform operations comprising:
receiving, at a node of a data confidence fabric (DCF), a DCF backbone;
installing the DCF backbone at the node, wherein the DCF backbone comprises multiple application program interfaces (APIs), and each of the APIs enables a different respective trust insertion component to be identified, and loaded into the DCF backbone;
receiving a config file at the node, wherein the config file describes which trust insertion technologies will be used, by which of the trust insertion components, to associate trust metadata with data received by the node, the trust insertion components update the trust metadata by adding additional trust metadata at the node, and the updated trust metadata is available to a consumer to enable the consumer to evaluate a trustworthiness of the data before consuming the data; and receiving, from a trust insertion component catalog, and installing, into the DCF backbone, the trust insertion components described in the config file, where operation of the trust insertion components to evaluate the data and insert trust metadata concerning that data is enabled by the DCF backbone.

12. The non-transitory storage medium as recited in claim 11, wherein the DCF backbone is blank at the time of installation at the node.

13. The non-transitory storage medium as recited in claim 11, wherein the APIs enable the node to invoke the one or more trust insertion components.

14. The non-transitory storage medium as recited in claim 11, wherein the node comprises hardware and/or software.

15. The non-transitory storage medium as recited in claim 11, wherein the node is one of a gateway, edge device, or cloud.

16. The non-transitory storage medium as recited in claim 11, wherein the config file identifies a function to be performed by the node with respect to the data received by the node.

17. The non-transitory storage medium as recited in claim 11, wherein a device that provides the data to the node is a sensor.

18. The non-transitory storage medium as recited in claim 11, wherein the trust insertion components, after installation in the DCF backbone, are invoked automatically as the data passes through the node.

19. The non-transitory storage medium as recited in claim 11, wherein the DCF backbone is blank prior to loading of the trust insertion components, and the DCF backbone cannot support performance of trust insertion operations until after the trust insertion components are loaded.

20. The non-transitory storage medium as recited in claim 11, wherein the DCF backbone is configured to be scanned by the node to enable the node to determine which of the trust insertion components are, or are not, installed at the node.

* * * * *